March 15, 1932.  E. E. LEHWESS  1,849,099
INCLOSURE
Filed May 1, 1929  6 Sheets-Sheet 5

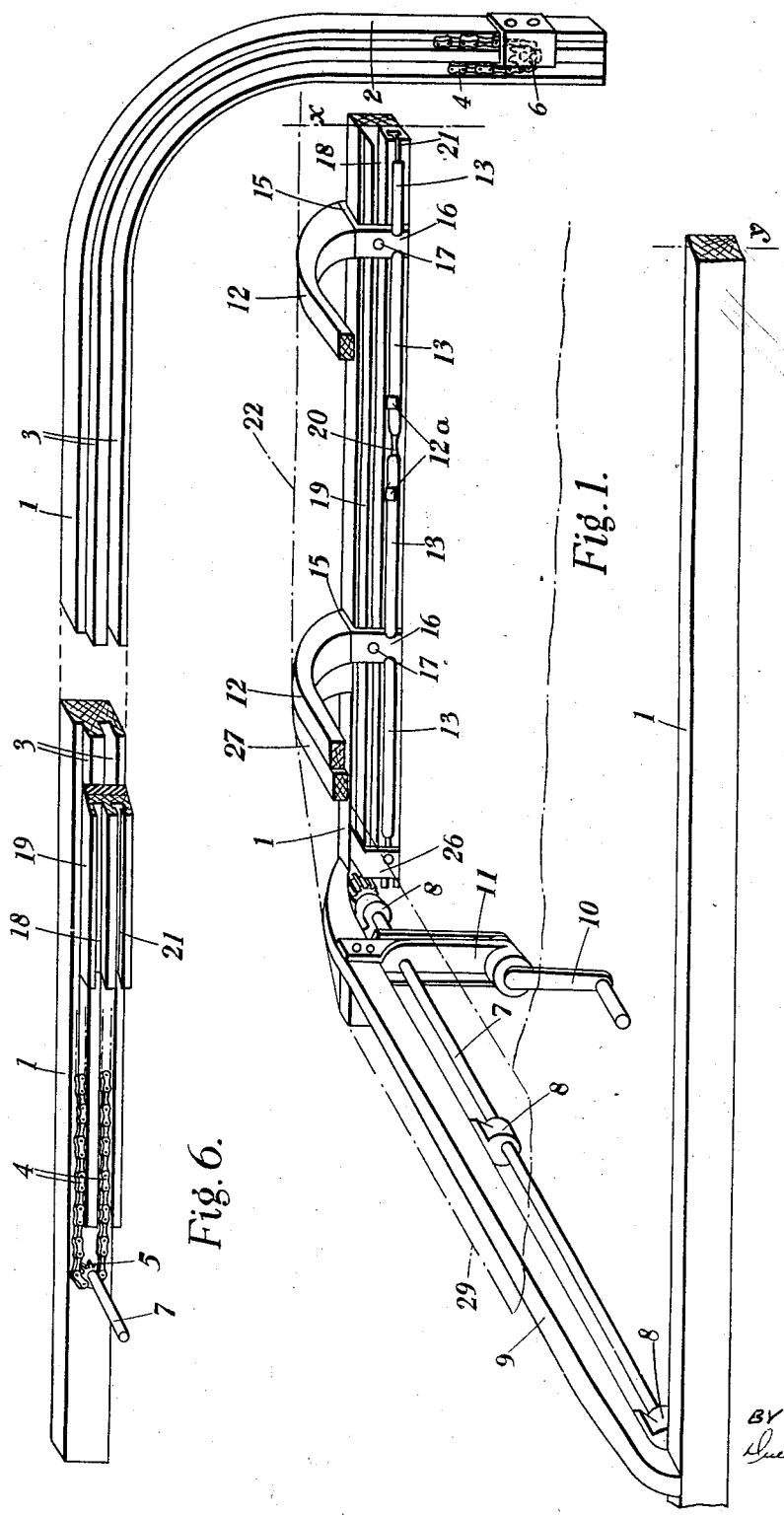

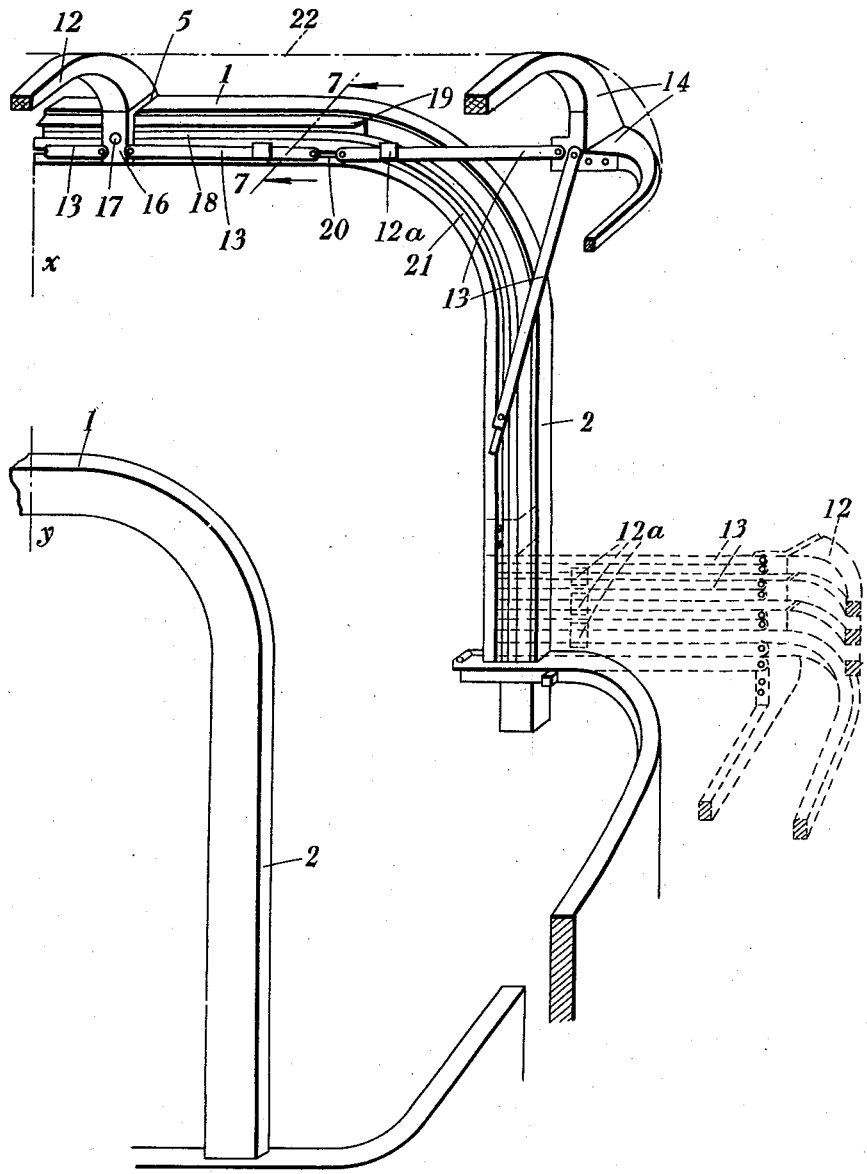

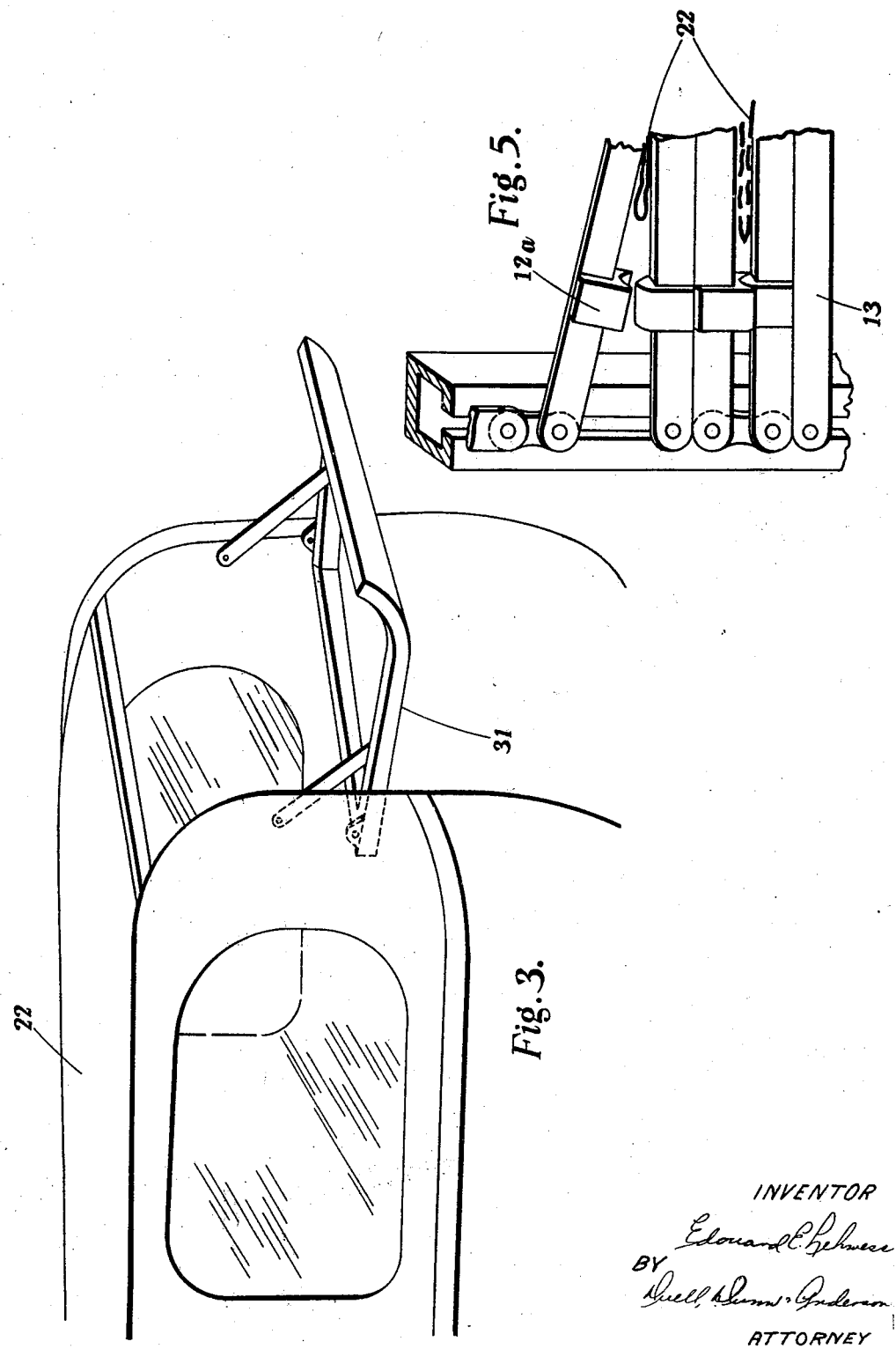

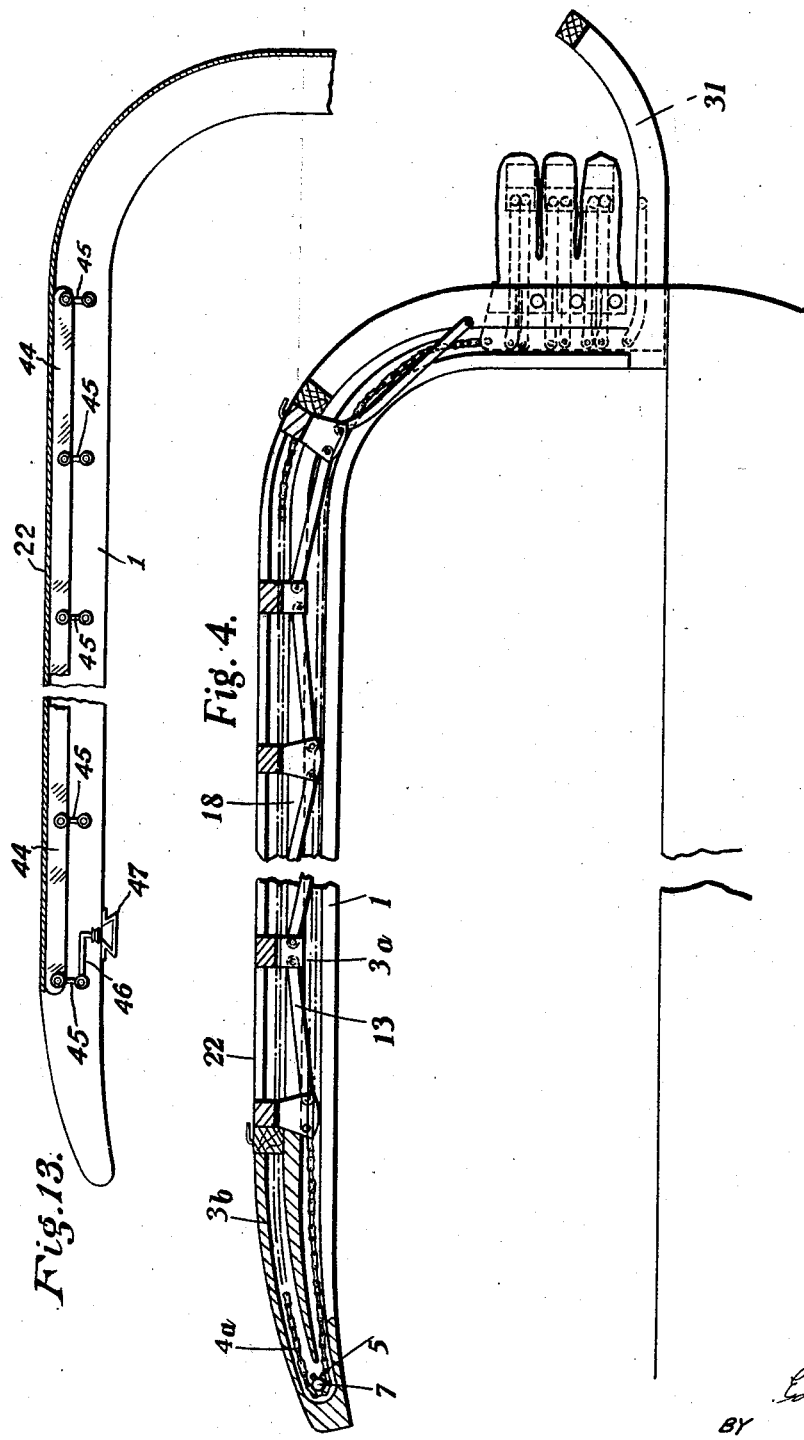

INVENTOR
Edouard E. Lehwess
BY
ATTORNEY

March 15, 1932. E. E. LEHWESS 1,849,099
INCLOSURE
Filed May 1, 1929   6 Sheets-Sheet 6
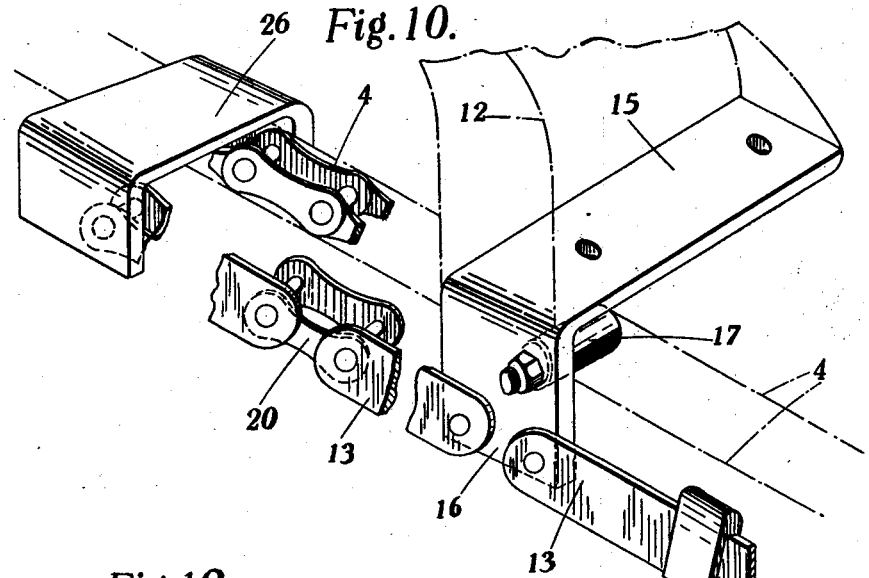
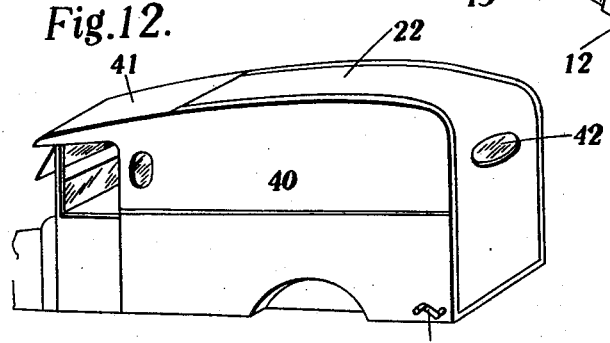
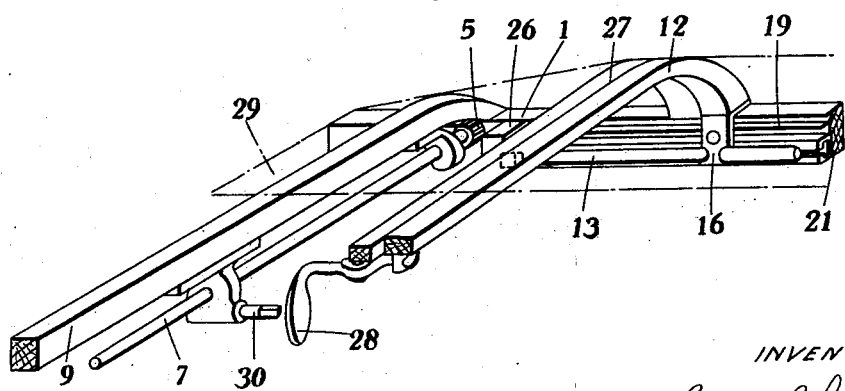
INVENTOR
Edward E. Lehwess
BY
ATTORNEY Patented Mar. 15, 1932

1,849,099

UNITED STATES PATENT OFFICE

EDOUARD E. LEHWESS, OF PARIS, FRANCE, ASSIGNOR TO MECHANICAL & GENERAL INVENTIONS COMPANY LIMITED, OF LONDON, ENGLAND, A CORPORATION OF GREAT BRITAIN

INCLOSURE

Application filed May 1, 1929, Serial No. 359,523, and in Great Britain May 22, 1928.

This invention relates to a functionally and structurally improved inclosure or hood capable of use in numerous different associations and, in its more specific aspects, aims to provide a device of this character particularly designed for use in connection with vehicles and, specifically, automobiles.

It it an object of the invention to provide a device of this character which may be operated readily in the instance of a motor vehicle by the driver and in which, if desirable, the driver will not have to bring the vehicle to a stand-still in order to effectuate such operation.

A further object is that of providing an inclosure, the position of which may be adjusted to any desired point in a minimum amount of time and which device will embody relatively few parts, each individually simple and rugged in construction and capable of being manufactured and assembled at relatively nominal cost.

An additional object is that of constructing an inclosure which will present an extremely pleasing appearance and which, moreover, will rigidly maintain its operative position and serve to effectually protect the occupants of the vehicle or other device to which the inclosure is applied, from the elements.

With these and further objects in mind reference is had to the attached sheets of drawings illustrating practical embodiments of the invention and in which:—

Figure 1 is a perspective view of an inclosure supporting and operating structure and illustrating, particularly, the forward portion of the same;

Fig. 2 is a similar view of the rear portion thereof;

Fig. 3 is a perspective view of the rear portion of a vehicle and showing the inclosure member applied thereto;

Fig. 4 is a partly sectional side view of the structure which may be employed;

Fig. 5 is a fragmentary perspective view of certain of the stay or brace elements;

Fig. 6 is a perspective view of one of the guide or rail members and in which certain of the parts have been broken away to disclose underlying construction;

Fig. 10 is a fragmentary perspective view of certain of the operating mechanism employed;

Fig. 11 is a similar view of the supporting bows or stays;

Fig. 12 shows the invention in association with a commercial type vehicle body, and Fig. 13 is a side elevation of certain mechanism which may be employed in conjunction with any of the several forms of the invention heretofore illustrated.

In view of the fact that the present invention is primarily intended to be utilized in connection with vehicles, and particularly motor vehicles, the inclosure has been shown in this association. At this time it will be understood, however, that the invention might be employed advantageously in numerous different associations and, moreover, might, with facility, be placed in an installation in which it serves as a replacement for a part, or that the inclosure might be applied as part of an initial installation, or in other words, as part of the body work.

Figure 7:
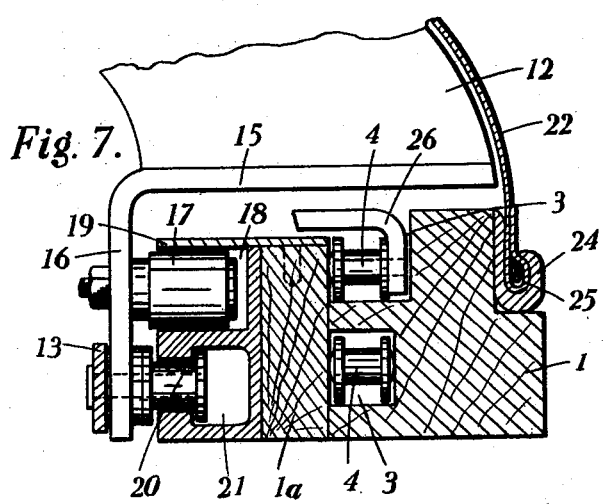
Fig. 7 is an enlarged transverse sectional view taken along the lines 7—7 of Fig. 2.

Thus, in the several views, the numeral 1 indicates sills disposed adjacent the upper edges of a vehicle and preferably disposed in that plane which is to be occupied by the vehicle top. These sills may conveniently be curved rearwardly and downwardly as has been indicated at 2, and grooves or channels 3 are formed in the sills as has been shown in Fig. 7. The inner faces of these channels may be closed as, for example, by strips 1ª suitably secured one to each of the sills and these strips mount double rails 18, the upper of which is covered by a plate 19 and the lower of which has its arms bent to extend inwardly, thus providing a somewhat confined space 21. Riding within the upper portion of the rail are a series of rollers 17 which rest upon an upper arm of the lower rail portion and these rollers mount brackets 16 having their bodies extended as at 15 to carry the ends of the bows or stays 12. These brackets have their lower ends extending below the roller 17 and have the inner ends of connecting elements 13 pivotally attached to them. As shown particularly in Fig. 10, the outer ends of adjacent elements are connected to each other as, for example, by means of links 20, one portion of which rides beyond the outer end of the lower rail part 18 and the other portion thereof being disposed within the space 21 and being of such dimension that an accidental dislodgment therefrom is precluded.

By means of this structure it will be apparent that the bows or stays 12 are interconnected in such manner that they may be shifted in unison along the rails and by having a web 22 of proper material connected thereto, which material constitutes the top for the vehicle, it will be understood that such top will likewise be shifted.

The cover plate 19 may be discontinued beyond the point at which the sills extend rearwardly and downwardly, as has been shown in Fig. 2 and thus, as such shifting occurs, the connecting elements incident to the guiding influence exerted thereon by the lower portions of the rails, will move rearwardly and downwardly and may thereupon, and as shown in dotted lines in Fig. 2, fold to provide a compact unit. In this connection it will be observed that if desired the body proper of the vehicle may be provided with a hinged portion 31 forming, normally, the rear of the inclosure, which portion may be swung downwardly to furnish a support for the reception of this unit. Furthermore, and as shown in Fig. 5, the bows or stays may each conveniently carry spacing blocks 12ª of any suitable material. As a consequence of this construction the covering provided by the web of material 22 will have ample space to be properly accommodated without injury between the stays when the inclosure is in wholly or partially collapsed positions.

Now with a view to providing means serving positively and readily to shift the structure supported by the rollers 17, a number of desirable constructions may be employed. For example, an endless sprocket chain 4 may be disposed within the channels 3 and have its opposite ends pass around sprockets 5 and 6, the former being mounted on a shaft 7. Brackets 26 are provided and connected one to each of the upper runs or portions of the chains 4. Operation of the shaft 7 with the resultant shifting of the inclosure or hood may be achieved in a number of different manners. As has, for example, been shown in Fig. 1, this shaft may be mounted in bearings 8 carried by a support 9 and may be coupled by means of any suitable mechanism (not shown) disposed within a housing 11 to a crank 10. This crank, when rotated, serves to correspondingly move the shaft 7, thus shifting the chain 4 and moving the inclosure to the position desired. Obviously, in lieu of the crank and connecting means, any desired form of drive might be employed as, for example, that shown in Fig. 11, in which a worm wheel may be secured to the shaft and be driven by a worm shaft, the rear end 30 of which may mount a crank or be otherwise suitably driven. Obviously, and again referring to Fig. 7, an adequately tight seal may be afforded as, for example, by associating a channel member 24 with the sill and having the side edge of the covering 22 beaded as at 25, to extend slidably within this channel member and have its movements confined thereby.

With the parts in operative position it will be understood that the inclosure is maintained against accidental displacement by, for example, providing a cross brace 27 to the rear of the support 9 and a manually operable locking device 28 may be associated with this brace and cooperate with the foremost stay or bow 12. At this time it will be observed that this locking device is so disposed with reference to the extension 30 of the worm that the latter is inaccessible. As a consequence, the locking device must be released before the worm may be operated and, therefore, no damage may occur to the parts. It will be appreciated that if, in lieu of a manual drive for the shaft some other suitable form of actuation as, for example, a power drive is employed, the same expedient might be resorted to with a view to preventing damage. However, with the locking device released and the shaft 7 operating, it will be apparent that the chain 4 or other operating member employed will serve to shift all of the stays rearwardly. The outermost series of stays will thereupon move downwardly and be guided by those track portions which are in association with the sill parts 2 and the covering 22 will fold neatly and without injury to provide in conjunction with the stays, a compact unit, as shown in Fig. 5. Obviously, if it is merely desired to open the rear portion of the vehicle, no actuation of the shaft 7 will be necessary, but simply the receiving member 31 may be shifted downwardly as shown in Fig. 3. However, if thereupon the actuation of the shaft follows, this receiving member will serve to compactly support the unit provided by the stays, links, covering, etc., as shown in Fig. 4. At this time it will be observed and has been shown in Fig. 2, that the rearmost stay or bow indicated at 14 is of the double type (so that the covering may be complementary to the receiving element 31 when the latter extends in normal position) and this element is preferably of larger area than the other stays or bows, as a consequence of which a structure is provided somewhat in the nature of a receptacle within which the inner parts of the inclosure nest.

Figure 8:
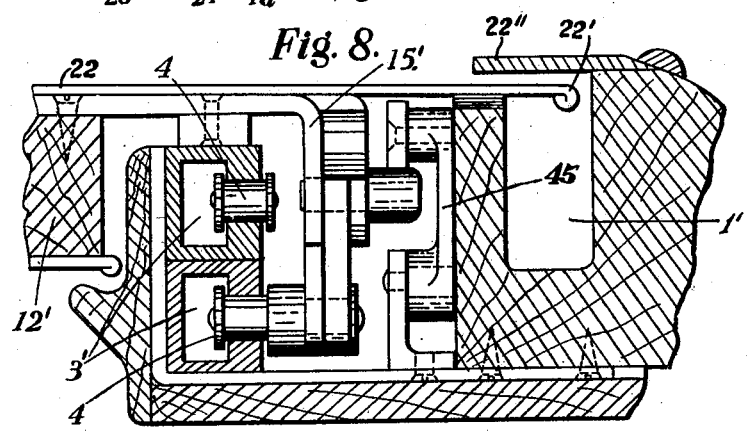
Figs. 8 and 9 are views similar to Fig. 7 but showing slightly different forms of construction.

It will be appreciated that as shown in Fig. 8, the structure might be modified. For example, the sills 1 might be formed with grooves 1' into which the beaded end 22' of the covering is extended, these sills carrying hood portions 22" overlapping the beaded edges of the covering. A track or guide element is furnished which presents channel portions 3' facing in a direction opposite to that in which the corresponding portions of Fig. 7 face. The endless chain 4 or other operating element is confined to move along the paths defined by these track portions and carries brackets 15' mounting bows or supporting members 12', carrying the covering 22. In this form of construction, the links 13 are, in the usual manner, shifted by the element 4 and these links carry studs 17 which may be in the form of rollers and which cooperate with a confining and guiding structure 18' extending to a point adjacent that at which the links are to be collapsed. Thus, in many respects, the structure will be more satisfactory than that heretofore described, and the operation thereof duplicating substantially the operation of the parts as set forth in the preceding paragraphs.

Figure 9:
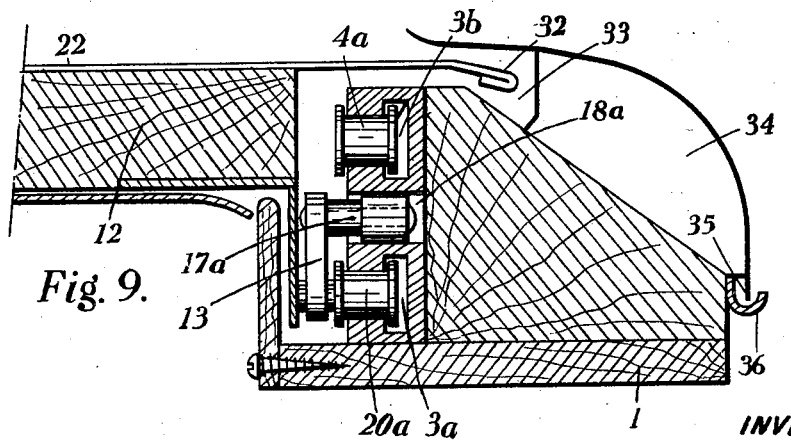

In the form of structure shown in Fig. 9, a rail member having portions 3ª and 3ᵇ is substituted in lieu of the channels 3 and a shifting member 4ª is mounted in the uppermost of these portions, the ends of this member being connected as shown in Fig. 4, to the outermost element of a series of connecting members 20ª. A covering 22' is secured to a stay or bow 12' and the latter is secured by a bracket 15' to one of the series of connecting members 20ª riding within the lower rail portion 3ª. A series of these members are, of course, provided and serve to connect the series of links 13 which, in this instance, mount between them rollers 17ª riding within a space 18ª. A hood 35 is disposed in an arc and has its upper edge overlapping a beaded portion 32 formed at the edge of the covering 22' and its lower edge extends within a gutter 36, it being obvious that by this structure there will be no danger of the mechanism being injured by rain.

As has been shown in Fig. 12, a delivery body 40 may utilize the mechanism of the present invention, in which instance it is preferred that the covering 22 extend to a point adjacent the lower and rear end of the body and that the mechanism be operated by a crank or other suitable driving member 43, it being apparent that when this member is actuated the entire inclosure may be shifted and collapsed. In this connection, it will be also understood that if desired the inclosure might shift and collapse forwardly rather than rearwardly.

Finally, referring to Fig. 13, it will be observed that the sills 1 have been shown and that adjacent the same there has been illustrated a bar 44 movably mounted upon a plurality of levers 45, the inner ends of which are pivotally associated with the mounting structure. A bell-crank lever 46 or any other suitable operating member is coupled to one or more of the levers 45, and when rocked serves to shift the bar to a position at which it will be intimately against the face of the covering or web 22, thus clamping the latter. As a consequence, it will be appreciated that the entrance of moisture and dust will be virtually precluded and, moreover, any tendency of the parts to rattle, will be overcome. Obviously, a retaining element 47 might be associated with one or both of the sills and cooperatively engage the handle or member 46 so that normally the latter may be retained in such position that the bar will remain clamped against the covering or its adjacent structure.

From the foregoing, it will be understood that, among others, the several objects specifically aforementioned are achieved. It will furthermore be appreciated that numerous changes in construction and rearrangement of the parts might be resorted to without departing from the spirit of the invention as defined by the claims.

Having described my invention what I claim as new, and desire to secure by Letters Patent, is:

1. A device of the character described including, in combination, means providing a guide, an operating member associated with said guide and movable with respect thereto, means for shifting said member, links movably secured to said operating member, a web of material, means supporting said web connected to said links and providing a covering element, and confining means cooperating with said links to prevent substantial movement of the same with respect to said operating member, said confining means extending adjacent the portion of the path of travel of said member.

2. A device of the character described including, in combination, means providing a guide, an operating member associated with said guide and movable with respect thereto, means for shifting said member, links movably secured to said operating member, a web of material, means supporting said web connected to said links and providing a covering element, and confining means cooperating with said links to prevent substantial movement of the same with respect to said operating member, said confining means extending adjacent the forward portion of the path of travel of said operating member and being interrupted adjacent the rear portion thereof, whereby in said latter portion said links may move with respect to said operating member and said web of covering material will be folded.

3. A device of the character described including, in combination, an endless sprocket chain, a sprocket gear for moving the same, means for confining said chain to a substantially predetermined path of travel, pairs of links pivotally connected to each other adjacent their outer ends and pivotally connected to said sprocket chain adjacent their inner ends, a covering, means supporting said covering connected to said links adjacent their outer ends, means for normally confining such outer ends to travel along a path substantially parallel to that traversed by the operating member, said confining means being interrupted whereby the outer ends of said pairs of links may move to points remote from said sprocket chain.

4. A device of the character described including, in combination, an operating member, means for moving the same, means for confining said member to a substantially predetermined path of travel, pairs of links pivotally connected to each other adjacent their outer ends and pivotally connected to said operating member adjacent their inner ends, a covering, means supporting said covering connected to said links adjacent their outer ends, and means for normally confining such outer ends to travel along a path substantially parallel to that traversed by the operating member, said confining means being interrupted whereby the outer ends of said pairs of links may move to points remote from said operating means, whereby adjacent pairs of links occupy positions substantially parallel to and above each other, and said covering extending in folds between such adjacent pairs of links.

5. An inclosure including, in combination, a movable operating member, means for actuating the same, a track for confining the movements of said member, a further confining track, pairs of inextensible links having their outer ends pivotally connected, their inner ends being pivotally connected to said operating member, means connected to said links and cooperating with said second confining track to normally limit the movements of the links to a path adjacent that traversed by the operating member, and said last named means clearing said second confining track upon said operating member being shifted to a predetermined position, whereby said pairs of links may fold upon each other at points beyond said second track, a covering, and means supporting said covering secured to the outer ends of said pairs of links.

In testimony whereof I affix my signature.

EDOUARD E. LEHWESS.